United States Patent
Ryba et al.

(10) Patent No.: US 7,015,679 B2
(45) Date of Patent: Mar. 21, 2006

(54) CIRCUIT AND METHOD FOR SUPPLYING AN ELECTRICAL A.C. LOAD

(75) Inventors: Jiri Ryba, Hubikova (CZ); Pavel Grasblum, Ruzowa (CZ); Petr Stekl, Plzen (CZ)

(73) Assignee: Freescale Semiconductor, Inc., Austin, TX (US)

( * ) Notice: Subject to any disclaimer, the term of this patent is extended or adjusted under 35 U.S.C. 154(b) by 192 days.

(21) Appl. No.: 10/741,055

(22) Filed: Dec. 19, 2003

(65) Prior Publication Data
US 2004/0135557 A1    Jul. 15, 2004

(30) Foreign Application Priority Data
Dec. 20, 2002  (GB) .................................... 0229878

(51) Int. Cl.
*G05F 1/40*   (2006.01)
(52) U.S. Cl. ..................................................... 323/271
(58) Field of Classification Search .. 363/56.01–56.05, 363/97, 98, 131, 132; 323/237, 239, 265, 323/266, 268, 271
See application file for complete search history.

(56) References Cited

U.S. PATENT DOCUMENTS 5,635,826 A  *  6/1997  Sugawara .................... 323/300

| | | | |
|---|---|---|---|
| 6,194,881 B1 | 2/2001 | Parker et al. | |
| 6,266,256 B1 * | 7/2001 | Lehnert et al. | ................ 363/37 |
| 6,483,730 B1 * | 11/2002 | Johnson, Jr. | ................. 363/123 |
| 6,870,132 B1 * | 3/2005 | Stava | ..................... 219/130.51 |

FOREIGN PATENT DOCUMENTS

| EP | 1 017 156 A1 | 7/2000 |
|---|---|---|
| EP | 1 304 792 A1 | 4/2003 |
| FR | 2 660 498 A1 | 10/1991 |
| GB | 2 267 788 A | 12/1993 |

OTHER PUBLICATIONS

UK Foreign Search report, date of search May 6, 2003.

* cited by examiner

*Primary Examiner*—Matthew V. Nguyen

(57) ABSTRACT

A method and circuit for supplying a variable voltage to an electrical a.c. load (R, L), comprising: a control signal input for receiving a switching control signal to control load output voltage; first and second circuit output terminals (ACL1, ACL2) for connection to the load; first switch means (S1) having an input coupled to the control signal input and having an output coupled between one (ACL1) of the circuit output terminals (ACL1) and a first a.c. line terminal (AC1); second switch means (S2) having an input coupled to the first switch means and having an output coupled between the first and second circuit output terminals (ACL1, ACL2) and coupled to a second a.c. line terminal (AC2); and providing a switching control signal to the control signal input to switch the first and second switch means complementarily. The switch means may each comprise a power transistor (Q1; Q2) and a bridge rectifier (B1; B2).

15 Claims, 4 Drawing Sheets

CIRCUIT AND METHOD FOR SUPPLYING AN ELECTRICAL A.C. LOAD

FIELD OF THE INVENTION

This invention relates to circuits for supplying electrical a.c. loads, and particularly to such circuits which enable variation of the r.m.s. value of the voltage applied to the a.c. load.

BACKGROUND OF THE INVENTION

Triac conduction angle control is a popular known technique for supplying an a.c. load with varying supply voltage. To carry out this control, the conduction angle of a triac device is adjusted by changing the switching instant of the triac device. In this way the conduction angle can be varied from 180° to 0°. The voltage r.m.s. value is a function of the conduction angle. This method frequently represents a cost-effective solution, and it is the most used technique for low-cost appliances, widely used in present day consumer products. A typical application of triac conduction angle control of an a.c. motor is depicted in FIG. 1A.

However, conduction angle control is not preferred for the latest designs because of its high harmonic pollution, which is not in compliance with strict European regulations.

There are available triac switching techniques which decrease the harmonic content of the supply current waveform. However, these techniques are not able to achieve significant effect which would be needed to comply with modern EMI/EMC (electromagnetic interference/electromagnetic compatibility) regulations.

Conduction angle control also produces low motor efficiency when supplied with non-sinusoidal current. Conduction angle control also suffers from unpleasant acoustic noise produced by motors supplied by means of triac devices.

Converter topology is another known technique for supplying single-phase a.c. loads. In this technique, the a.c. line voltage is converted to a d.c. voltage, usually using a diode bridge rectifier. The d.c. voltage is filtered by a filter capacitor and converted back to a.c. voltage by an inverter. The inverter is usually implemented as a single-phase bridge and the output voltage is determined by the switching of the bridge switches. Mainly PWM switching techniques are used. In this way it is possible to control both the amplitude and the frequency of the output voltage independently. This method is suitable for high power and high efficiency drives. A typical application of converter topology for controlling a single phase a.c. induction motor is depicted in FIG. 1B.

Converter topology suffers from the disadvantage that the components used for system realization are typically of high cost. Thus this topology is not suitable for low-cost applications.

Converter topology also suffers from the disadvantage of high harmonic content of the supply current waveform. Standard topologies use a diode bridge rectifier at the input. When the diode bridge is connected in parallel to the d.c. link filter capacitor, the current drawn from the a.c. line is non-sinusoidal with high peaks. To eliminate this some power factor correction technique needs to be implemented, thus increasing the system cost.

From U.S. Pat. No. 6,256,211 there is known a circuit device for driving an a.c. electric load incorporating a rectifying bridge that has a first input connected to one terminal of the electric load and a second input connected to the outlet of an a.c. mains supply. The rectifying bridge has output terminals connected to a power switch, which is controlled by an electric signal. The circuit device has two circuit loop-back links connected in parallel to the electric load. The first and second links are alternately activated by the positive and negative half-waves of the mains supply when the switch is in "off" state. FIG. 1C depicts this circuit device.

However, this approach has the disadvantage of high cos φ limitation. The device is capable of driving only electric loads whose power factor is close to one. If the phase shift between load current and supply voltage is higher, the device cannot ensure the sinusoidal load current, thus increasing the current harmonic content and lowering the electric device efficiency. Such a device is not capable of driving all possible types of a.c. loads (e.g., shaded pole a.c. induction motors, pure induction load, etc.). This significantly limits functionality and the circuit device cannot be used for driving a general a.c. load.

This approach also uses high number of power components, which increase power losses. This decreases the overall efficiency of the system, and also increases the device cost.

A need therefore exists for a circuit for supplying an electrical a.c. load wherein the abovementioned disadvantage(s) may be alleviated.

STATEMENT OF INVENTION

In accordance with a first aspect of the present invention there is provided a circuit for supplying an electrical a.c. load as claimed in claim 1.

In accordance with a second aspect of the present invention there is provided a method for supplying an electrical a.c. load as claimed in claim 9.

BRIEF DESCRIPTION OF THE DRAWING(S)

One a.c. load current freewheeling circuit device incorporating the present invention will now be described, by way of example only, with reference to the accompanying drawing(s), in which.

DESCRIPTION OF PREFERRED EMBODIMENT(S)

Figure 1A:
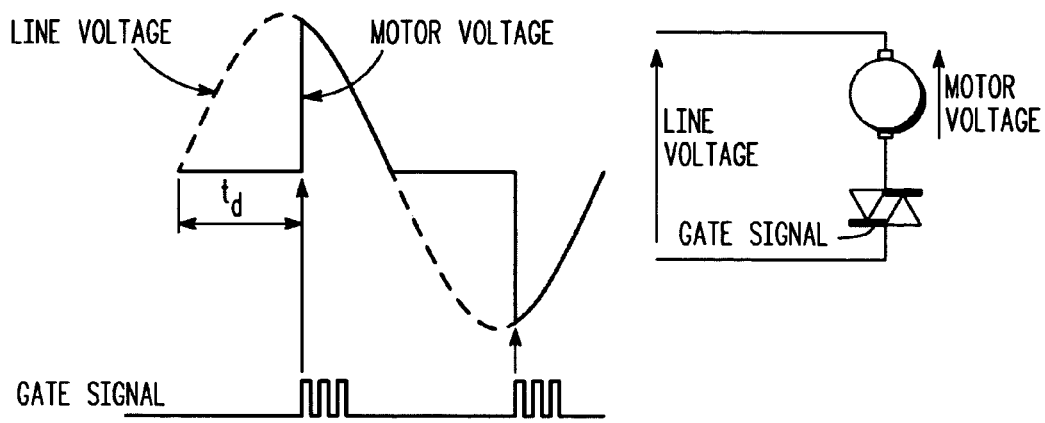
FIG. 1A, FIG. 1B and FIG. 1C show respectively prior art motor driving circuits.

FIG. 1A depicts a typical, known application of triac conduction angle control of an a.c. motor. However, as discussed above, such conduction angle control is not preferred for modern designs because of its high harmonic pollution, which is not in compliance with strict EMI/EMC regulations. Although triac switching techniques are available which decrease the harmonic content of the supply current waveform, these techniques are not able to achieve significant effect which would be needed to comply with modern EMI/EMC regulations.

Figure 1B:
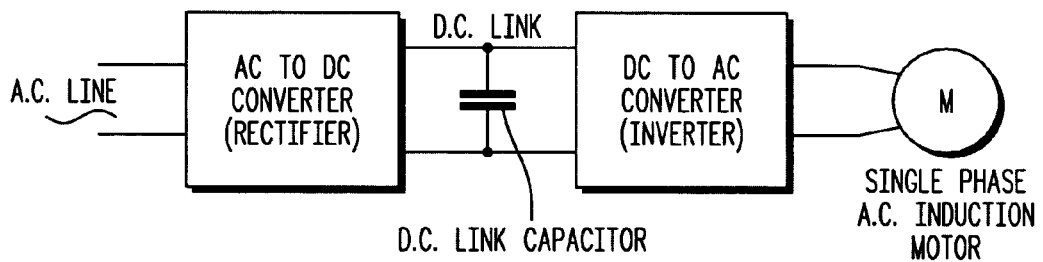

FIG. 1B illustrates a typical, known application of converter topology for controlling a single phase a.c. induction motor. However, as discussed above, such converter topology suffers from the disadvantage that the components used for system realization are typically of high cost, making such topology unsuitable for low-cost applications. Converter topology also suffers from the disadvantage of high harmonic content of the supply current waveform, which requires elimination by some power factor correction technique, thus increasing system cost.

Figure 1C:
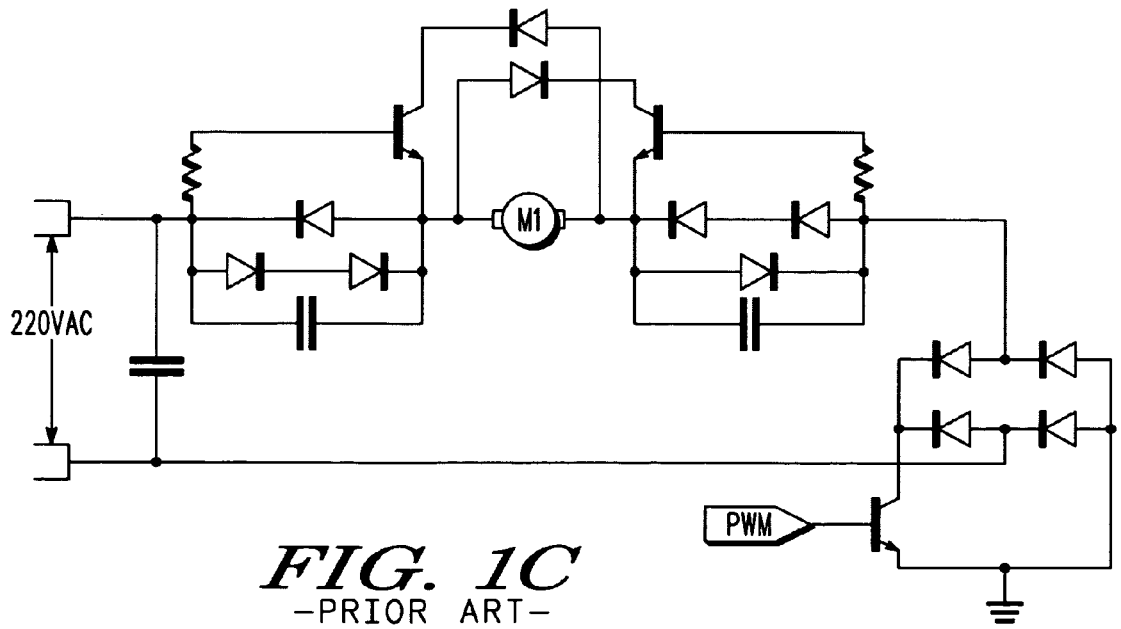

FIG. 1C illustrates a circuit device known, from U.S. Pat. No. 6,256,211, for driving an a.c. electric load. However, as discussed above, such a device has the disadvantage of high $\cos \phi$ limitation, making the device capable of driving only electric loads whose power factor is close to one. Such a device is not capable of driving all possible types of a.c. loads (e.g., shaded pole a.c. induction motors, pure induction load, etc.), significantly limiting functionality and making the circuit device unsuitable for use in driving a general a.c. load. Also, this circuit device uses high number of power components, which increase power losses, decrease the overall system efficiency, and also increases device cost.

Figure 2:
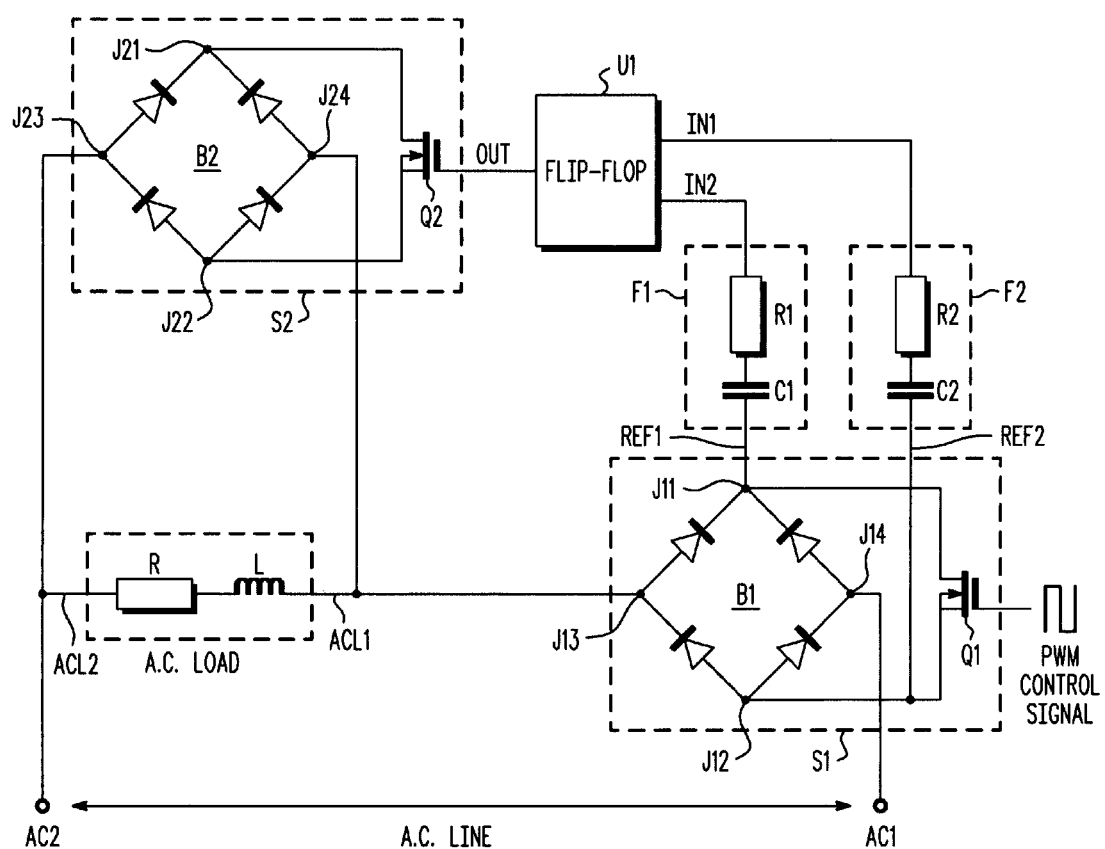
FIG. 2 shows a block schematic circuit diagram of a circuit device incorporating the present invention.

FIG. 2 is a block diagram of a circuit for supplying an electrical a.c. load in accordance with the present invention. As shown, the power part of the circuit consists of two bidirectional switches S1 and S2. Both the bidirectional switches S1 and S2 are implemented as rectifying bridges (B1; B2), with power switches (Q1; Q2) connected to respective bridge output terminals (J11, J12; J21, J22). The power switch Q2 has its control coupled (via filter elements F1, F2 and a flip-flop U1) to the output terminals J11, J12 of the rectifying bridge B1.

The bidirectional switch S1 is connected to one terminal ACL1 of the a.c. electric load, shown as a series resistor R and inductor L, and to the outlet AC1 of an a.c. line (AC1–AC2). The switch S1, according to a switching PWM control signal applied to its transistor Q1, connects and disconnects the electric a.c. load to/from the a.c. line.

The other bidirectional switch S2 is connected in parallel to the electric load. The purpose of the switch S2 is to provide electric load current freewheeling. The switch S2 is switched on when the electric load is disconnected from the a.c. line.

Switching of the bidirectional switch S1 is controlled by power switch Q1, and switching of the bidirectional switch S2 is controlled by power switch Q2. The Q1 and Q2 power switches can be implemented as standard power IGBT (insulated gate bipolar transistor), MOSFET (metal-oxide-semiconductor field-effect transistor) or bipolar transistor. The switching of the power switch Q1 is controlled by the PWM control signal applied to the power switch Q1, and switching of the power switch Q2 is controlled by the output of the flip-flop U1, whose state is determined by pulses Ref1 and Ref2 from the switch S1. The power switches Q1 and Q2 are switched complementarily.

Since switching of the Q1 and Q2 power switches alternate with respect to each other, it is not possible for an inverted signal from one power switch simply to transfer to the other. The circuit of FIG. 2 allows control of the power switches Q1 and Q2 complementarily, independently of a.c. line voltage and current polarity. The pulses, Ref1 and Ref2, on the positive side J11 and negative side J12 of the rectifying bridge B1 of the bidirectional switch S1, are used as control signals for flipping the flip-flop U1. The rising edge on the positive side J11, or falling edge on the negative side J12, of the rectifying bridge switches the flip-flop U1 'on'. The falling edge on the positive side J11, or rising edge on the negative side J12, switches the flip-flop 'off'. Using both signals is not necessary, but it increases speed of flip-flop switching, mainly in regions where one of the control signals is poor. The capacitive coupling set up by the filter elements F1, F2 (R1, C1; R2, C2) separates the switching signals for the power switch Q2 from disturbance by the 50/60 Hz signal from the a.c. mains.

It will be understood that in the circuit of FIG. 2, current freewheeling for the a.c. electric load is provided where the load is supplied by a chopped sinusoidal voltage, whose r.m.s. voltage may be varied under control of the switching PWM control signal. To provide proper current freewheeling the circuit utilizes feedback signals derived from the bidirectional power switch/switches, which connects/connect the electric a.c. load to the line voltage. The feedback signals are fed to the flip-flop circuit, which controls the current freewheeling.

Figure 3:
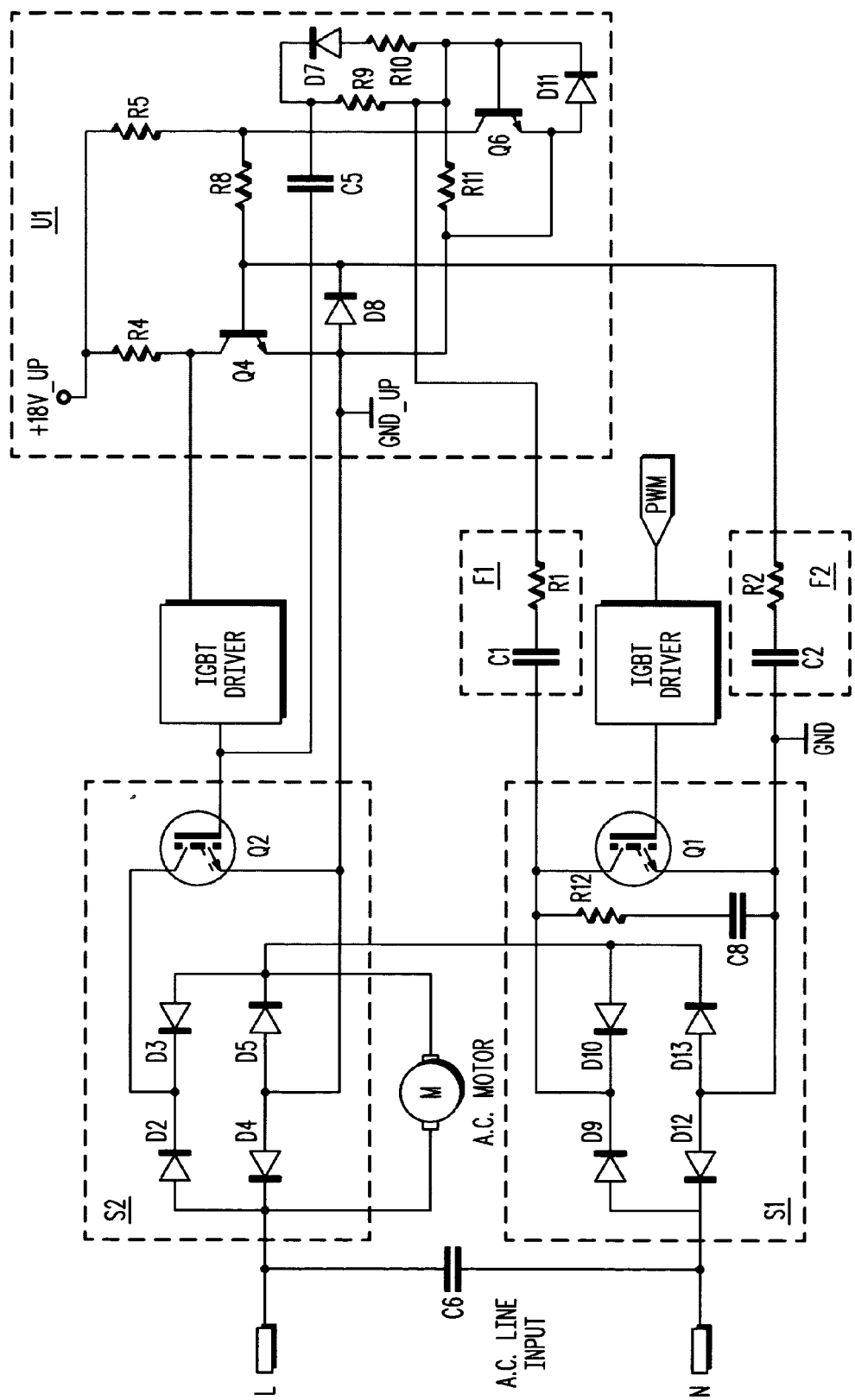
FIG. 3 shows block schematic circuit diagram of a practical implementation of the circuit of FIG. 1.

FIG. 3 shows in greater detail a practical implementation of the circuit of FIG. 2. As shown in FIG. 3, the bidirectional switch S1 comprises an IGB transistor Q1, whose gate electrode is coupled, via an IGBT driver circuit, to a PWM terminal. The IGBT driver amplifies current for supplying the gate of the power transistor Q1. The source and drain electrodes of the transistor Q1 are connected to a full-wave rectifier bridge, formed by diodes D9, D10, D12, D13, at the junction of diodes D9, D10 and at the junction of diodes D12 and D13 respectively. A resistor R12 and a capacitor C8 are also connected in series between the source and drain electrodes of the transistor Q1.

The bidirectional switch S2 comprises an IGB transistor Q2, whose gate electrode is coupled, via an IGBT driver, to the output of a flip-flop U1. The IGBT driver amplifies current for supplying gate of the power transistor Q2. The source and drain electrodes of the transistor Q2 are connected to a full-wave rectifier bridge, formed by diodes D2, D3, D4, D5, at the junction of diodes D2 and D3 and at the junction of diodes D4 and D5 respectively.

The junction of diodes D10 and D13 is connected to the junction of diodes and D3 and D5 and is connected to one side of an AC motor M, of which another side is connected to the junction of diodes D2 and D4. A.C. line input terminal L is connected to the junction of diode D2 and D4 and to one terminal of the AC motor M. A.C. line input terminal N is connected to the junction of diodes D9 and D12. A capacitor C6 is connected across the line input terminals L and N to filter from the a.c. line input voltage. The junction of diodes D9 and D10 is coupled via series-connected elements C1 and R1 to one input of the flip-flop U1, another input of which is coupled to the junction of diodes D12 and D13 via series-connected elements C2 and R2.

The flip-flop circuit U1 is based on small signal transistors Q4 and Q6, with resistors R4, R5, R8, R9, R10, R11, capacitor C5, and diodes D7, D8 and D1. Capacitor C5 with resistor R9 and resistor R8 set up positive closed loops as a standard monostable flip-flop. The capacitor C5 is added to separate the d.c. component from the feedback signal. Because the RC time constant of elements R9 and C5 is much longer than the switching period, the circuit behaves as a bistable for the chosen given high switching frequency.

Figure 4:
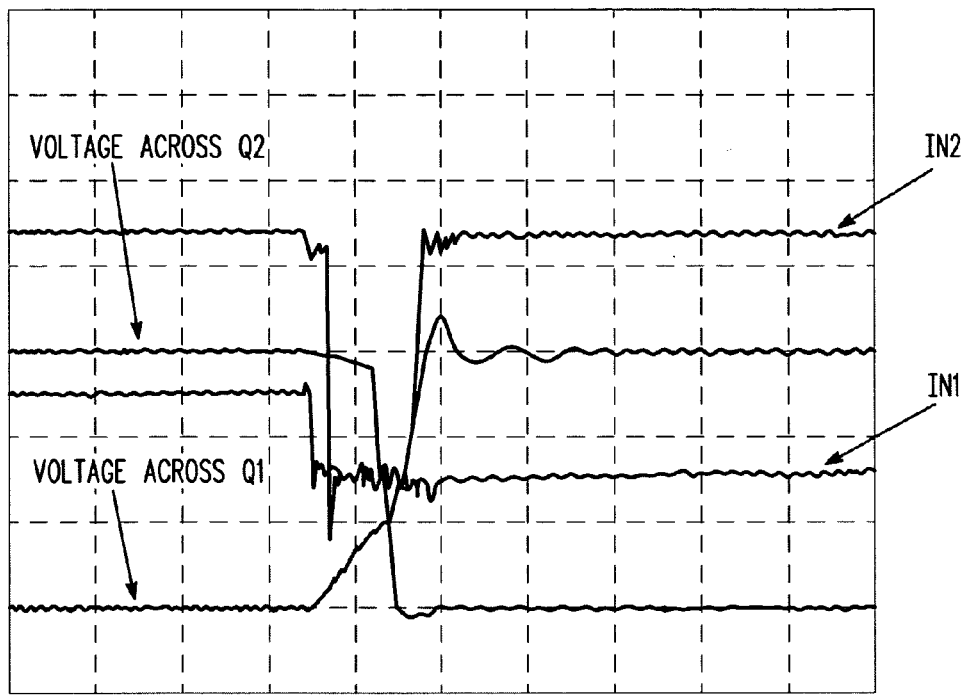
FIG. 4 shows a graphical representation of voltages occurring in the circuit of FIG. 2 or 3 during use.

FIG. 4 shows waveforms of the voltages, in use of the circuit of FIG. 2 or 3, at the flip-flop inputs IN1, IN2, together with waveforms of the voltages across the power transistors Q1 and Q2, when the switch S1 turns-off.

Figure 5:
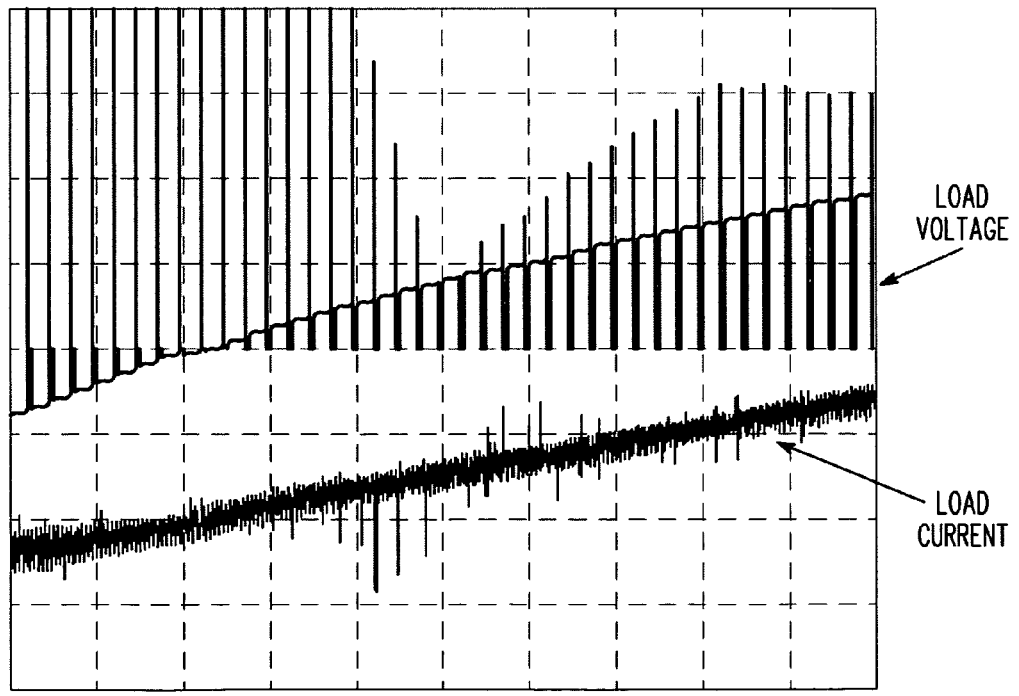
FIG. 5 shows a graphical representation of load voltage and load current waveforms produced in use of the circuit of FIG. 2 or 3.

FIG. 5 shows load voltage and current waveforms produced in use of the circuit of FIG. 2 or 3.

It will be appreciated that the circuit of FIG. 2 or 3 may be conveniently be fabricated in integrated circuit form.

It will be understood that the a.c. load current freewheeling circuit described above provides the following advantages:

Line current harmonic content reduction—The harmonic content of line current is significantly reduced, principally compared with the most common triac conduction angle control. The circuit uses PWM modulation and thus easily complies with European EMI/EMC regulations. Higher harmonics are not introduced to the current waveform.

Low cost—The circuit offers significant reduction of the system cost compared with other commonly used techniques based on PWM modulation. The circuit takes advantage of high-end converter topology while keeping the overall cost at reasonable level.

Low harmonic content in the load current—In the circuit the load current is not disturbed by high level of higher harmonics. Higher harmonic injection into the load current waveform causes problems mainly when supplying electric motors. Non-disturbed motor current benefits are smooth motor torque, low acoustic noise produced by the motor and higher efficiency of the whole system, thus increasing the range of application of such a circuit.

No limitation of cos φ—The circuit is not limited only by the cos φ of supplied loads. The feedback signals, which control the load current freewheeling, work under all conditions of a.c. load. The proper signal is generated for all combinations of the a.c. load voltage and current polarities. The circuit is capable of driving all types of common a.c. loads (inductive or resistive).

Minimal number of power components—The circuit requires a low number of power components.

Minimal cost of the components—The power components represent the most expensive part of the system. The lower number of power components decreases not only the cost of the components alone but because of the lower requirements for cooling it also decreases the cost of the heatsink, thus also increasing system efficiency (printed circuit board size requirements are lower as well, again decreasing the cost).

What is claimed is:

1. A circuit for supplying an electrical a.c. load with a voltage that may be varied, the circuit comprising:
   a control signal input for receiving a switching control signal to control load output voltage;
   first and second circuit output terminals for connection across the load;
   first switch means having an input coupled to the control signal input and having an output coupled between one of the first and second circuit output terminals and a first a.c. line terminal; and
   second switch means having an input coupled to the first switch means and having an output coupled between the first and second circuit output terminals and coupled to a second a.c.line terminal,
   the first and second switch means being arranged to be switched by the complementarily.

2. The circuit of claim 1 wherein at least one of the first and second switch means comprises:
   transistor means coupled to the switch means and having a control electrode coupled to the switch means input and having other electrodes; and
   rectifier bridge means having first terminals coupled to the other electrodes of the transistor means, and having second terminals coupled to the output.

3. The circuit of claim 1 further comprising flip-flop means coupled between the first switch means and the second switch means.

4. The circuit of claim 3 wherein the flip-flop means comprises transistor means, resistor means and capacitor means arranged to provide closed loop operation.

5. The circuit of claim 4 wherein a time constant of the resistor means and the capacitor means is arranged to produce bistable flip-flop operation at a desired operation frequency.

6. The circuit of claim 1 further comprising filter means coupled between the first switch means and the second switch means.

7. The circuit of claim 1 wherein the control signal input is arranged to receive a pulse width modulated switching control signal.

8. An integrated circuit comprising substantially the circuit of claim 1.

9. A method for supplying a variable voltage to an electrical a.c. load, the method comprising:
   providing a control signal input for receiving a switching control signal to control load output voltage;
   providing first and second circuit output terminals for connection across the load;
   providing first switch means having an input coupled to the control signal input and having an output coupled between one of the first and second circuit output terminals and a first a.c. line terminal;
   providing second switch means having an input coupled to the first switch means and having an output coupled between the first and second circuit output terminals and coupled to a second a.c. line terminal; and
   providing a switching control signal to the control signal input to switch the first and second switch means complementarily.

10. The method of claim 9 wherein at least one of the first and second switch means comprises:
    transistor means coupled to the switch means and having a control electrode coupled to the switch means input and having other electrodes; and
    rectifier bridge means having first terminals coupled to the other electrodes of the transistor means, and having second terminals coupled to the output.

11. The method of claim 9 further comprising providing flip-flop means coupled between the first switch means and the second switch means.

12. The method of claim 11 wherein the flip-flop means comprises transistor means, resistor means and capacitor means arranged to provide closed loop operation.

13. The method of claim 12 wherein a time constant of the resistor means and the capacitor means is arranged to produce bistable flip-flop operation at a desired operation frequency.

14. The method of claim 9 further comprising providing filter means coupled between the first switch means and the second switch means.

15. The method of claim 9 wherein the control signal is a pulse width modulated signal.

* * * * *